(12) United States Patent
Fischer et al.

(10) Patent No.: US 8,944,195 B2
(45) Date of Patent: Feb. 3, 2015

(54) ELECTRICAL DRIVE UNIT FOR A MOTOR VEHICLE

(75) Inventors: Raphael Fischer, Herzogenaurach (DE); Michael Bogner, Eckental (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 38 days.

(21) Appl. No.: 13/513,930

(22) PCT Filed: Dec. 1, 2010

(86) PCT No.: PCT/EP2010/068659
§ 371 (c)(1),
(2), (4) Date: Jun. 5, 2012

(87) PCT Pub. No.: WO2011/069874
PCT Pub. Date: Jun. 16, 2011

(65) Prior Publication Data
US 2012/0242137 A1    Sep. 27, 2012

(30) Foreign Application Priority Data
Dec. 7, 2009    (DE) .......................... 10 2009 057 317

(51) Int. Cl.
H02K 9/02    (2006.01)
H02K 5/124    (2006.01)
H02K 5/10    (2006.01)

(52) U.S. Cl.
CPC . *H02K 5/124* (2013.01); *H02K 5/10* (2013.01)
USPC ..................................................... 180/65.51

(58) Field of Classification Search
USPC ........................ 301/6.5; 180/65.1, 378, 65.51
See application file for complete search history.

(56) References Cited

U.S. PATENT DOCUMENTS

| | | | | |
|---|---|---|---|---|
| 4,460,181 | A * | 7/1984 | Araoka ........................... | 277/318 |
| 4,611,551 | A * | 9/1986 | Ferguson et al. ............. | 114/339 |
| 4,913,258 | A * | 4/1990 | Sakurai et al. ................ | 180/242 |
| 5,538,330 | A * | 7/1996 | Ehrlich ....................... | 301/124.1 |
| 5,596,235 | A * | 1/1997 | Yazaki et al. ................ | 310/67 R |
| 5,619,082 | A * | 4/1997 | Choi ............................... | 310/88 |
| 5,650,676 | A * | 7/1997 | Blumenberg .................. | 310/88 |
| 5,785,390 | A * | 7/1998 | Gold et al. .................. | 301/108.1 |
| 6,583,952 | B1 * | 6/2003 | Grantz et al. ............... | 360/99.08 |
| 6,811,011 | B2 * | 11/2004 | Bastien ....................... | 192/85.23 |
| 7,228,928 | B2 * | 6/2007 | Mizutani et al. ........... | 180/65.51 |
| 7,350,605 | B2 * | 4/2008 | Mizutani et al. ........... | 180/65.51 |
| 7,597,114 | B2 * | 10/2009 | Buckingham et al. ........ | 137/433 |
| 7,958,959 | B2 * | 6/2011 | Yogo et al. ................. | 180/65.51 |

(Continued)

FOREIGN PATENT DOCUMENTS

| | | |
|---|---|---|
| DE | 3716912 | 12/1988 |
| GB | 2078878 | 1/1982 |
| JP | 54105709 | 8/1979 |

(Continued)

*Primary Examiner* — J. Allen Shriver, II
*Assistant Examiner* — Brian Cassidy
(74) *Attorney, Agent, or Firm* — Volpe and Koenig, P.C.

(57) ABSTRACT

An electrical drive unit for a motor vehicle, with the drive unit including a wheel hub drive that drives a vehicle wheel. The wheel hub drive has a sealing element which is affected by friction and by means of which the interior of the wheel hub drive is sealed off from the surroundings in an airtight manner. A ventilation device is provided by which a pressure difference between the prevailing air pressure in the interior of the wheel hub drive and the prevailing air pressure of the surrounding air can be compensated by displacing volumes of air.

10 Claims, 2 Drawing Sheets

(56) References Cited

U.S. PATENT DOCUMENTS

2004/0080223 A1* 4/2004 Shimizu ............... 310/75 C
2004/0140723 A1* 7/2004 Severien ................. 310/90

FOREIGN PATENT DOCUMENTS

| JP | 04185533 | 7/1992 |
| WO | 2008046897 | 4/2008 |

* cited by examiner

ELECTRICAL DRIVE UNIT FOR A MOTOR VEHICLE

BACKGROUND

The invention relates to an electrical drive unit for a motor vehicle with a wheel hub drive, in particular, a wheel hub motor, driving a vehicle wheel.

On order for an electrical drive unit having a wheel hub drive to meet the requirements for service life common in the automotive industry, the wheel hub drive must have a corresponding seal. Here, the fact that temperatures between −30° C. and +50° C. can occur in the interior of a wheel hub drive depending on the time of year, weather, and operating state, is problematic. If the wheel hub drive is sealed hermetically with regard to the surroundings with a conventional seal, a greatly increased inner pressure builds up in the interior of the wheel hub drive due to heating during the operation of the wheel hub drive, which could lead to the result that the air enclosed in the wheel hub drive can lift the sealing lips of a sealing element provided for sealing and can generate an at least partial pressure equalization to the outside. During the subsequent standstill phase of the wheel hub drive, the wheel hub drive cools down, the air in the interior of the wheel hub drive contracts, and a lower pressure builds up relative to the surrounding outside the wheel hub drive. If this lower pressure becomes too large, the sealing element can allow air to penetrate via the sealing lips from the surroundings into the interior of the wheel hub drive, so that the wheel hub drive "breathes." This has the effect, for one, that the sealing friction and thus the wear of the sealing element is increased when, during the pressure equalization, an increased contact force acts on the sealing lips of the sealing element. Second, foreign bodies or liquids, such as water, can be transported into the interior of the wheel hub drive when air is led through the opened sealing lips. This can lead to damage both on the wheel hub drive itself and also on the active sealing surface of the sealing element of the wheel hub drive.

SUMMARY

The objective of the invention is therefore to provide an electrical drive unit for a motor vehicle in which reduced wear of the sealing element and also of the wheel hub drive itself is achieved.

The objective is met according to the invention by the features of the invention. Advantageous constructions are specified below and in the claims.

The electrical drive unit according to the invention for a motor vehicle has a wheel hub drive driving a vehicle wheel, wherein the wheel hub drive has a sealing element that is exposed to friction and by means of which the interior of the wheel hub drive is closed air-tight relative to the surroundings. The invention distinguishes itself in that a ventilation device is provided by which a pressure difference between the air pressure predominating in the interior of the wheel hub drive and the air pressure predominating in the surroundings can be equalized by the displacement of air volumes.

The electrical drive unit according to the invention here has advantageously a wheel hub drive whose interior is sealed air-tight relative to the surroundings, i.e., the space outside of the wheel hub drive, by a sealing element exposed to friction. If the seal was realized by a sealing element constructed as a labyrinth seal, a pressure equalization by the sealing element can indeed be realized, but there is the risk here of taking in liquids, in particular, water, and/or foreign bodies from the surroundings into the interior of the wheel hub drive. Because a ventilation device is also provided in addition to a sealing element exposed to friction, it is possible to guarantee pressure equalization between the interior of the wheel hub drive and the surroundings and simultaneously to be able to reliably filter out foreign bodies from the air taken in by the ventilation device, in that the ventilation device guides the air volumes such that it can be guaranteed that the foreign bodies cannot penetrate into the interior of the wheel hub drive. The ventilation device according to the invention is here advantageously constructed such that the air volume difference produced by heating and cooling is displaced between the interior of the wheel hub drive and the surroundings such that, for a wheel hub drive closed air-tight by the sealing element, no significant pressure difference relative to the surroundings can build up in the interior of the wheel hub drive. The air volumes displaced here are guided such that it can be guaranteed that neither foreign bodies, especially in the form of contaminants, nor water can penetrate into the interior of the wheel hub drive. Thus it is possible to protect the sealing element from damage and wear and simultaneously to protect the wheel hub drive itself from foreign bodies and/or liquids penetrating into the wheel hub drive.

According to one advantageous construction of the invention, the ventilation device has an air duct element, wherein the air duct element has a first end section leading into the interior of the wheel hub drive and a second end section leading into the surroundings. For this purpose, a bore hole is advantageously provided on the wheel hub drive, with the air duct element being led with its first end section by means of this bore hole into the interior of the wheel hub drive. The air duct element is used here as a guide line for exhaust air and feed air from and to the wheel hub drive. The bore hole is advantageously provided in a wheel journal of the wheel hub drive or outside of a wheel bearing of the wheel hub drive on a non-rotating part of the wheel hub drive. Through the use of the air duct element it is possible to provide a secure and optimal pressure equalization between the interior of the wheel hub drive and the surroundings. The air duct element can be constructed here, for example, as a flexible or rigid hose.

According to a preferred construction of the invention, the air duct element is guided with its second end section into an inner space of a motor vehicle. In this way, purified and dry air from the interior of the motor vehicle can be drawn in by means of the air duct element and transported into the interior of the wheel hub drive.

It is further preferably provided that the air duct element is attached with its second end section to a ventilation device of the motor vehicle. The ventilation device can here be constructed as a ventilation system provided in the interior of the motor vehicle or as an air-conditioning system provided in the interior of the motor vehicle, wherein the purified and dry air provided from the ventilation or air-conditioning system can be drawn in and transported via the ventilation line into the interior of the wheel hub drive, in order to equalize the pressure there. Because the air duct element is guided with its second end section into the interior of the motor vehicle or into a ventilation device of the motor vehicle, it is prevented that foreign bodies and/or liquids can be transported via the air duct element into the interior of the wheel hub drive via the air duct element.

As an alternative here, it is preferably provided that the air duct element is constructed as a snorkel-shaped hose on its second end section. The snorkel-shaped hose can be constructed both as a rigid or also as a flexible hose. The free hose end of the snorkel-shaped hose is advantageously arranged at a position in the surroundings outside of the motor vehicle and outside of the vehicle wheel, wherein this position can come into contact with foreign bodies and/or liquids not at all or only to a small degree. The free hose end is preferably provided in the outer region of the wheel housing of the motor vehicle between the vehicle wheel and the motor vehicle. It is further preferably provided that the free hose end is directed toward the street, so that rising water can be held back up to a certain extent by the counter pressure in the interior of the wheel hub drive. If the vehicle wheel is standing in deep water, the snorkel-shaped hose is used to be able to allow pressure equalization above the water line.

According to one advantageous construction of the invention, the snorkel-shaped hose has a valve having a float body. The valve is here advantageously arranged directly in front of the free hose end, wherein the float body is guided in the valve such that it can be raised by the liquid penetrating into the free hose end and therefore is pressed against the free hose end, forming a seal, in order to prevent liquid from being able to penetrate into the snorkel-shaped hose and thus into the air duct element to the interior of the wheel hub drive. The float body is advantageously constructed as a ball that is freely moveable inside the valve.

Furthermore it is preferably provided that the ventilation device can be a variable volume device. The variable volume device can be constructed here as an equalization space within which additional volume of air generated in the interior of the wheel hub drive can expand. For example, the variable volume device is constructed as a kind of bellows, so that the variable volume device can expand like an accordion when air is fed in from the interior of the wheel hub drive. By providing such a variable volume device, air can be pushed back and forth in a closed system, with this being able to prevent foreign bodies and/or liquids from being able to penetrate into the system and thus into the interior of the wheel hub drive. The variable volume device is advantageously arranged on the second end section of the air duct element. However, it is also possible that the variable volume device is provided directly on the vehicle wheel within which the wheel hub drive is arranged.

According to another advantageous construction of the invention, on a wheel journal of the wheel hub drive, a bore hole is provided, within which a filter device is arranged. By providing a filter device within a bore hole it is possible that, due to the porosity of the filter device, first, foreign bodies can be filtered out from the air and, simultaneously, pressure can be equalized. The filter device can be constructed here, for example, as a sintered bronze filter. It is further possible to provide a filter device that is used typically in a steering area and that prevents contamination of the inner volume when pressure is equalized between the air volume enclosed by the steering collar and the surroundings. The bore hole could be constructed both centered on the wheel journal or else also arranged eccentric to this wheel journal. The eccentric bore hole is advantageously formed at an angle to the rotational axis of the bearing of the wheel hub drive.

It is further preferably provided that the bore hole has a conical shape. If the bore hole and thus also the filter device have a conical shape, then it is possible to be able to prevent liquid penetration in an especially effective way due to a possible outward acceleration of the liquid under a centrifugal force effect. The cone of the bore hole is advantageously constructed such that the liquid can be discharged outward again from the inner region of the wheel hub drive due to the acting centrifugal forces. Furthermore it is also possible, however, that the bore hole and thus the filter device has a cylindrical shape.

The invention further relates to a motor vehicle, in particular, an electric vehicle, comprising an electric drive unit constructed and refined as above.

BRIEF DESCRIPTION OF THE DRAWINGS

The invention will be explained in more detail below using preferred embodiments with reference to the attached drawings.

Shown are.

DETAILED DESCRIPTION OF THE PREFERRED EMBODIMENTS

Figure 1:
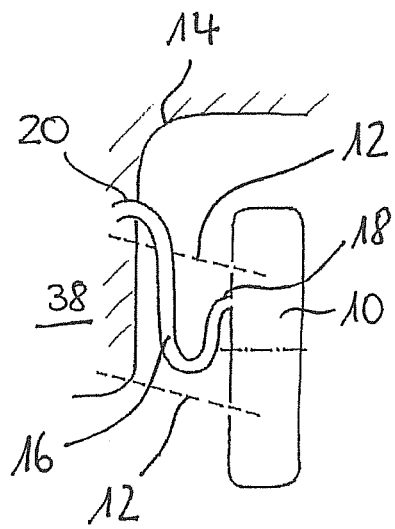
FIG. 1 is a schematic representation of a first embodiment of the electric drive unit according to the invention.

FIG. 1 shows schematically a first embodiment of an electric drive unit according to the invention with a wheel hub drive, not shown here, arranged on a vehicle wheel 10, wherein the vehicle wheel 10 is mounted by means of a wheel suspension 12 on a wheel housing 14 of the motor vehicle. To be able to allow pressure equalization between an interior of the wheel hub drive that is sealed by a sealing element, not shown here, and the surroundings, a ventilation device is provided that has an air duct element 16. The air duct element 16 is here constructed in the form of a hose that is guided from the interior of the wheel hub drive within the vehicle wheel 10 via the wheel housing 14 into the interior 38 of the motor vehicle. Here, a first end section 18 of the air duct element 16 is led into the interior of the wheel hub drive and a second end section 20 of the air duct element 16 opposite the first end section 16 is guided into the interior 38 of the motor vehicle. The ventilation is here towards the vehicle interior 38.

Figure 2:
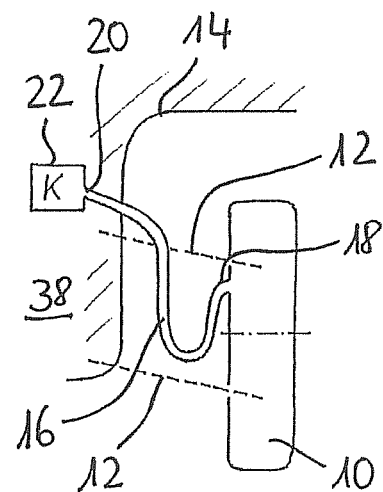
FIG. 2 is a schematic representation of a second embodiment of the electric drive unit according to the invention.

FIG. 2 shows an electric drive unit according to the invention according to a second embodiment, wherein here the air duct element 16 is connected with its second end section 20 to a ventilation device 22 that is provided in the interior 38 of the motor vehicle and that is constructed, for example, in the form of an air-conditioning system.

Figure 3:
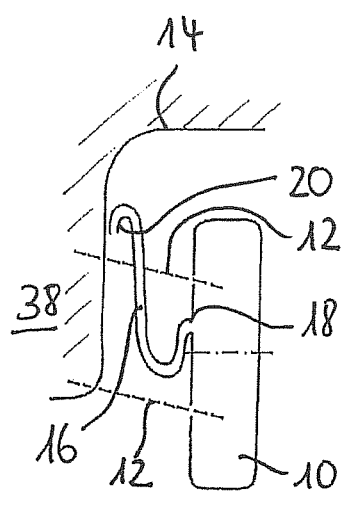
FIG. 3 is a schematic representation of a third embodiment of the electric drive unit according to the invention.

FIG. 3 shows an electric drive unit according to the invention according to a third embodiment, wherein here the second end section 20 of the air duct element 16 is not guided into the interior 38 of the motor vehicle, but instead into the surroundings between the vehicle wheel 10 and the wheel housing 14. The second end section 20 is thus provided here outside of the motor vehicle in a protected position, so that pressure can be equalized by displacing air volumes, but it can be simultaneously prevented that foreign bodies and/or liquids can penetrate into the air duct element 16 and thus into the interior of the wheel hub drive.

Figure 4:
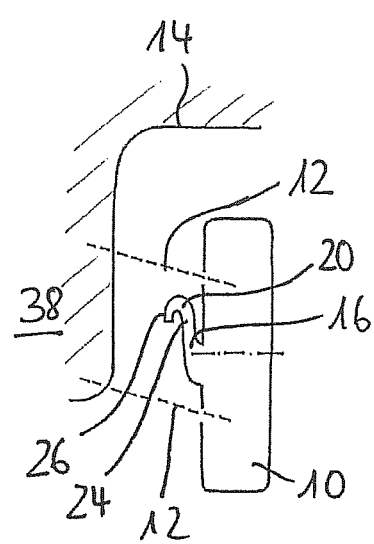
FIG. 4 is a schematic representation of a fourth embodiment of the electric drive unit according to the invention.

FIG. 4 shows an electric drive unit according to the invention according to a fourth embodiment, wherein a snorkel-shaped hose 24 is formed on the second end section 20 of the air duct element 16. The snorkel-shaped hose 24 here advantageously borders the outer peripheral surface of the vehicle wheel, wherein the free hose end 26 of the snorkel-shaped hose 24 is arranged between the vehicle wheel 10 and the wheel housing 14.

Figure 5:
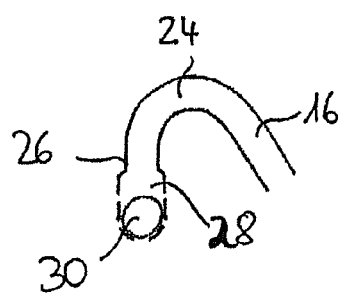
FIG. 5 is a schematic representation of an end section of the embodiment shown in FIG. 4.

FIG. 5 shows one possible construction of a free hose end 26 of the snorkel-shaped hose 24, wherein, on the free hose end 26, a valve 28 is provided within which a float body 30 is guided, advantageously in the form of a ball that can be raised by liquid penetrating into the snorkel-shaped hose 24 and can be pressed against the free hose end 26, wherein here the diameter of the float body 30 is greater than the diameter of the free hose end 26. The float body 30 here acts as a sealing element of the air duct element 16.

Figure 6:
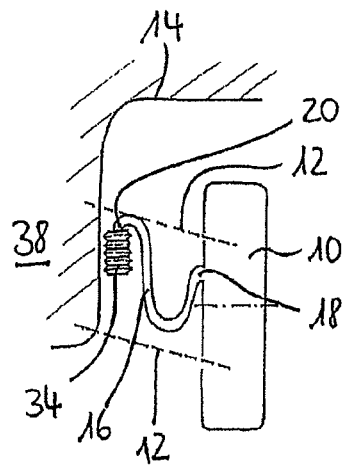
FIG. 6 is a schematic representation of a fifth embodiment of the electric drive unit according to the invention.

FIG. 6 shows an electrical drive unit according to a fifth embodiment in which the air duct element 16 has, on its second end section 20, a variable volume device 34. The variable volume device 34 is constructed in the form of a bellows that can expand like an accordion when air is fed in and can contract again when air is discharged. The variable volume device 34 here acts as a compensation space for additional air volumes generated in the interior of the wheel hub drive.

Figure 7:
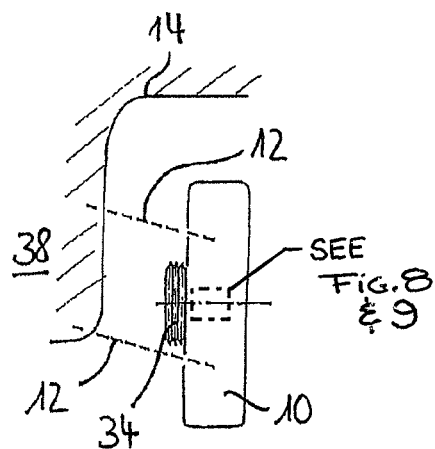
FIG. 7 is a schematic representation of a sixth embodiment of the electric drive unit according to the invention.

FIG. 7 shows a sixth embodiment of the electrical drive unit according to the invention in which the variable volume device 34 is arranged directly on the vehicle wheel 10.

Figure 8:
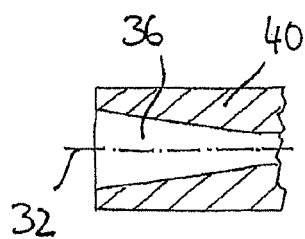
FIG. 8 is a schematic representation of a bore hole in a wheel journal according to the invention taken for example in the area indicated in FIG. 7, according to a first embodiment.
Figure 9:
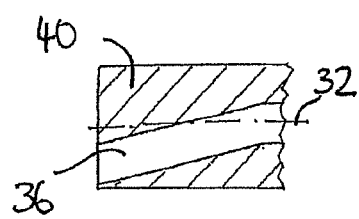
FIG. 9 is a schematic representation of the bore hole in a wheel journal according to the invention taken for example in the area indicated in FIG. 7, according to a second embodiment.

FIG. 8 and FIG. 9 show a bore hole 36 that is provided on a wheel journal 40 of the wheel hub drive within which a filter device, not shown here, is arranged. The bore hole shown in FIG. 8 is constructed centrally, advantageously, relative to the rotational axis of the wheel journal 40, wherein the form of the bore hole 36 has a conical shape. In FIG. 9, the bore hole 36 is constructed eccentric to the rotational axis 32 of the wheel journal 40, so that the bore hole 36 has an inclined surface. The bore hole 36 itself here has a cylindrical form.

LIST OF REFERENCE SYMBOLS

10 Vehicle wheel
12 Wheel suspension
14 Wheel housing
16 Air duct element
18 First end section
20 Second end section
22 Ventilation device
24 Snorkel-shaped hose
26 Free hose end
28 Valve
30 Float body
32 Rotational axis
34 Variable volume device
36 Bore hole
38 Interior of a motor vehicle
40 Wheel journal

The invention claimed is:

1. Electrical drive unit for a motor vehicle, comprising a wheel hub drive adapted to drive a vehicle wheel,
   wherein the wheel hub drive has a sealing element that is exposed to friction and by which an interior of the wheel hub drive at least in a region of the sealing element is closed air-tight relative to its surroundings, and
   a ventilation device by which a pressure difference between air pressure predominating in the interior of the wheel hub drive and air pressure predominating in a surrounding area is equalizable by displacement of air volumes.

2. Electrical drive unit according to claim 1, wherein the ventilation device has an air duct element that has a first end section leading into the interior of the wheel hub drive and a second end section leading into the surrounding area.

3. Electrical drive unit according to claim 2, wherein the air duct element is guided with the second end section into an interior of the motor vehicle.

4. Electrical drive unit according to claim 2, wherein the air duct element has the second end section connected to an air conditioning system of the motor vehicle.

5. Electrical drive unit according to claim 2, wherein the air duct element is constructed, on the second end section, as a snorkel-shaped hose with a downwardly facing opening.

6. Electrical drive unit according to claim 5, wherein the snorkel-shaped hose has a valve having a float body.

7. Electrical drive unit according to claim 1, wherein the ventilation device includes a variable volume device.

8. Electrical drive unit according to claim 1, wherein on a wheel journal of the wheel hub drive, a bore hole is provided, through which the pressure difference between the air pressure predominating in the interior of the wheel hub drive and the air pressure predominating in the surrounding area is equalizable.

9. Electrical drive unit according to claim 8, wherein the bore hole has a conical form.

10. An electric motor vehicle, comprising an electrical drive Unit according to claim 1.

* * * * *